(12) United States Patent
Munson et al.

(10) Patent No.: US 6,570,345 B1
(45) Date of Patent: May 27, 2003

(54) CONSTANT CURRENT REGULATOR FOR AIRPORT LIGHTING

(75) Inventors: Dean L. Munson, Pomona, CA (US); Kenneth Castellanos, Whittier, CA (US)

(73) Assignee: Ozuna Holdings Incorporated, Upland, CA (US)

( * ) Notice: Subject to any disclaimer, the term of this patent is extended or adjusted under 35 U.S.C. 154(b) by 18 days.

(21) Appl. No.: 09/932,758

(22) Filed: Aug. 16, 2001

(51) Int. Cl.[7] .............................................. H05B 37/00
(52) U.S. Cl. .................... 315/274; 315/278; 315/279; 315/297
(58) Field of Search .................. 315/274, 275, 315/276, 277, 278, 279, 291, 297, 307

(56) References Cited

U.S. PATENT DOCUMENTS

| | | | | |
|---|---|---|---|---|
| 3,609,515 A | * | 9/1971 | Babcock et al. ............ 323/347 |
| 3,699,385 A | * | 10/1972 | Paget ......................... 315/239 |
| 4,847,536 A | * | 7/1989 | Lowe et al. ................. 315/127 |
| 5,466,992 A | * | 11/1995 | Nemirow et al. ........... 315/276 |
| 5,939,838 A | | 8/1999 | Janik .......................... 315/277 |
| 6,181,072 B1 | * | 1/2001 | Leslie et al. ................ 315/194 |

* cited by examiner

Primary Examiner—Tan Ho
(74) Attorney, Agent, or Firm—Stout, Uxa, Buyan & Mullins, LLP; Frank J. Uxa

(57) ABSTRACT

A constant-current regulator for high-powered airport lighting loops combined a ferroresonant transformer and a digital programmable logic device to provide a versatile, software-modifiable current control for power transfer throughout a range of about 30 kW to 50 kW with uniformly good power factor and low harmonics without switching winding taps, and without requiring oil cooling.

8 Claims, 4 Drawing Sheets

CONSTANT CURRENT REGULATOR FOR AIRPORT LIGHTING

FIELD OF THE INVENTION

This invention relates to constant current regulators, and more specifically to a high-power regulator controlled by a programmable logic for airport lighting applications.

BACKGROUND OF THE INVENTION

Approach lights for airport runways typically include sets of high-wattage lamps connected in series in a lighting loop. In order to maintain a uniform intensity throughout the loop regardless of supply voltage variations, and to allow selected changes of intensity to cope with various weather and natural light conditions, the lighting loop has to be supplied with an adjustable constant current that is unaffected by supply voltage variations or other electrical disturbances.

In addition, airport lighting is subject to strict FAA regulations which require, for example, minimization of switching harmonics and minimization of inductive loading of the power supply. Switching harmonics are undesirable both as a reflection into the power supply, and in the lighting loop. In the latter, the skin effect from high power harmonics can require the use of heavier copper cables (which can be quite long in airport applications), and the radiation of harmonics from the lighting loop can interfere with sensitive communication systems such as instrument landing systems.

The individual lamps of the loop are typically fed from the loop through isolation transformers. If a lamp burns out, the isolation transformer primary winding acts as an inductor and puts a substantial inductive load on the circuit. For that reason, a shorting device is mounted across the secondary of the isolation transformer. When the lamp fails (i.e., opens up), the shorting device is activated to keep the integrity of the loop intact.

With conventional analog control circuitry, control of an airport lighting constant current regulator is feasible but is not very flexible or efficient. It is therefore desirable to give the regulator a maximum of flexibility, e.g., automatic power reduction on power-up, power-down and in error conditions.

Another problem of the prior art is that regulators exceeding about 30 kW power capacity usually required oil cooling, which was expensive and environmentally undesirable. Also, a regulator adaptable to a wide range of power outputs generally required switchable taps on the main transformer windings that required resetting the transformer when changing the load.

SUMMARY OF THE INVENTION

The present invention solves the problems of the prior art by providing a constant current regulator using an air-cooled ferroresonant transformer that maintains a good power factor and efficiency over the entire 30 kW to 50 kW output power range without requiring any tap switching, in conjunction with a control system using a programmable logic to track circuit conditions and user interfaces, and to take appropriate control actions in response thereto.

Each and every feature described herein, and each and every combination of two or more of such features, is included within the scope of the present invention provided that the features included in such a combination are not mutually inconsistent.

These and other aspects of the present invention are set forth in the following detailed description and accompanying claims, particularly when considered in conjunction with the accompanying drawings in which like parts bear like reference numerals.

DESCRIPTION OF THE PREFERRED EMBODIMENT

Figure 1:
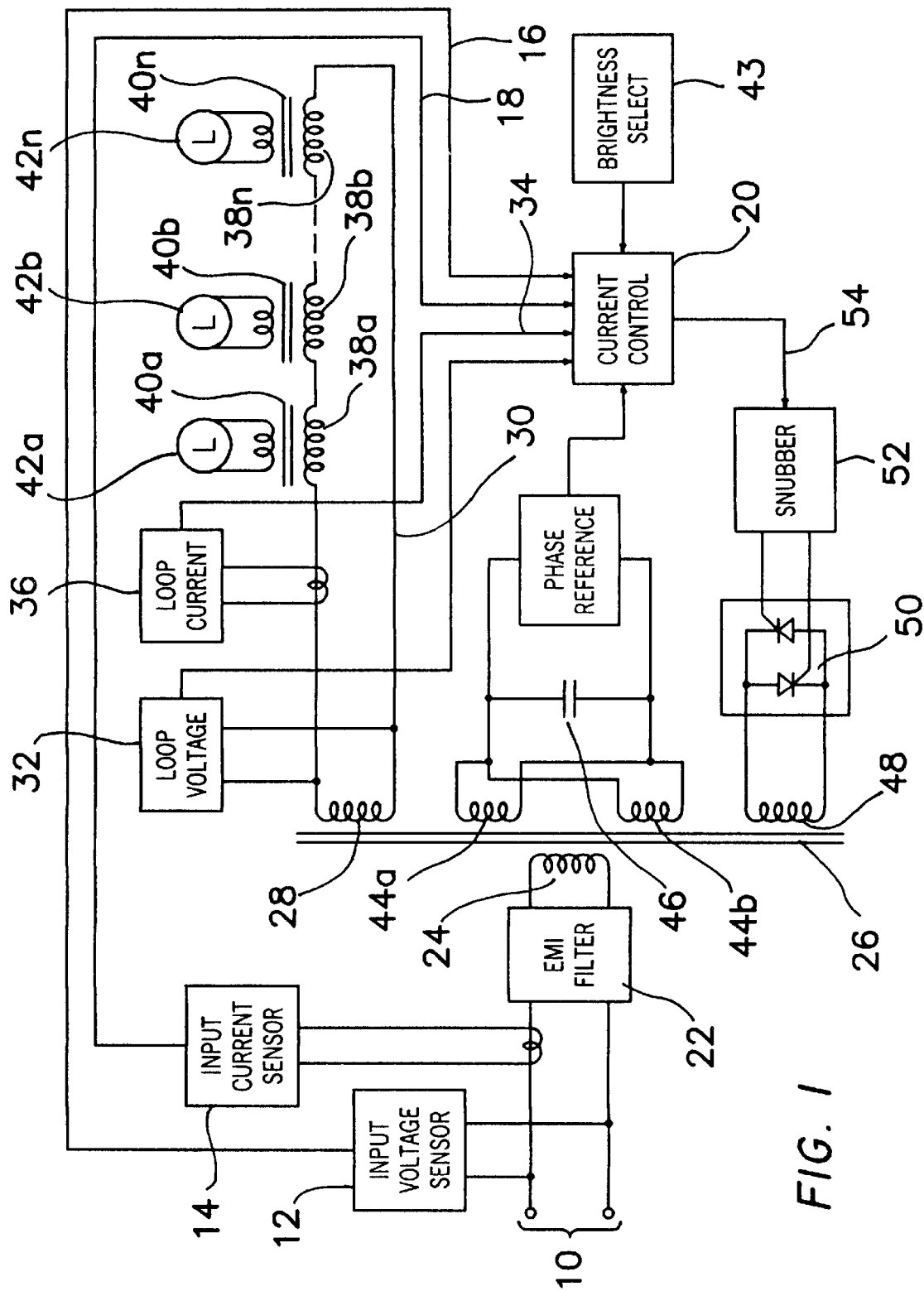
FIG. 1 is a block diagram of the regulator system of this invention.

FIG. 1 illustrates the basic circuitry of the inventive regulator. Power (typically 480 VAC) is applied to the power input 10. Input voltage sensor 12 and input current sensor 14 monitor the input power and supply error signals 16, 18 to the current control 20 if input voltage or input current are outside a predetermined safe range. The input power is applied through an electromagnetic interference (EMI) filter 22 to the primary winding 24 of ferroresonant transformer 26, the details of which are discussed below.

A first secondary winding 28 powers the lighting loop 30. The loop 30 is equipped with a loop voltage sensor 32 which, together with the loop current sensor 36, provides an indication of the power input to the lighting loop 30. The loop current sensor 36 senses the actual loop current and provides a signal 34 representative thereof to the current control 20 for control purposes.

The primary windings 38a through 38n of a plurality of isolation transformers 40a–40n are connected in series in the loop 30. The secondaries of the isolation transformers 40a–40n drive the individual lamps 42a–42n, respectively, of the lighting array. Because the isolation transformer primaries 38a–38n are connected in series, the same current flows through all of them, and the brightness of the lamps 42a–42n are therefore identical at the level selected by brightness selector 43.

A pair of parallel-connected second secondary windings 44a, 44b (shown separately for conformance with FIG. 2) drive a resonant capacitor 46. As described below, the capacitor 46 is so dimensioned as to resonate at the 60 Hz line frequency with the leakage inductance of the transformer 26, for a reason discussed below.

A third secondary winding 48 on transformer 26 is switched into and out of the circuit at a 60 or 120 Hz rate by a SCR switch 50 for a purpose described below. A snubber 52 is connected between the control line 54 and the switch 50, more specifically across the gate/cathode connections of the dual SCRs that make up the switch 50. This provides an interface between the gate trigger circuitry of the current control 20 and the gates/cathodes of the switch SCRs, as well as transient protection for the switch 50.

Figure 2:
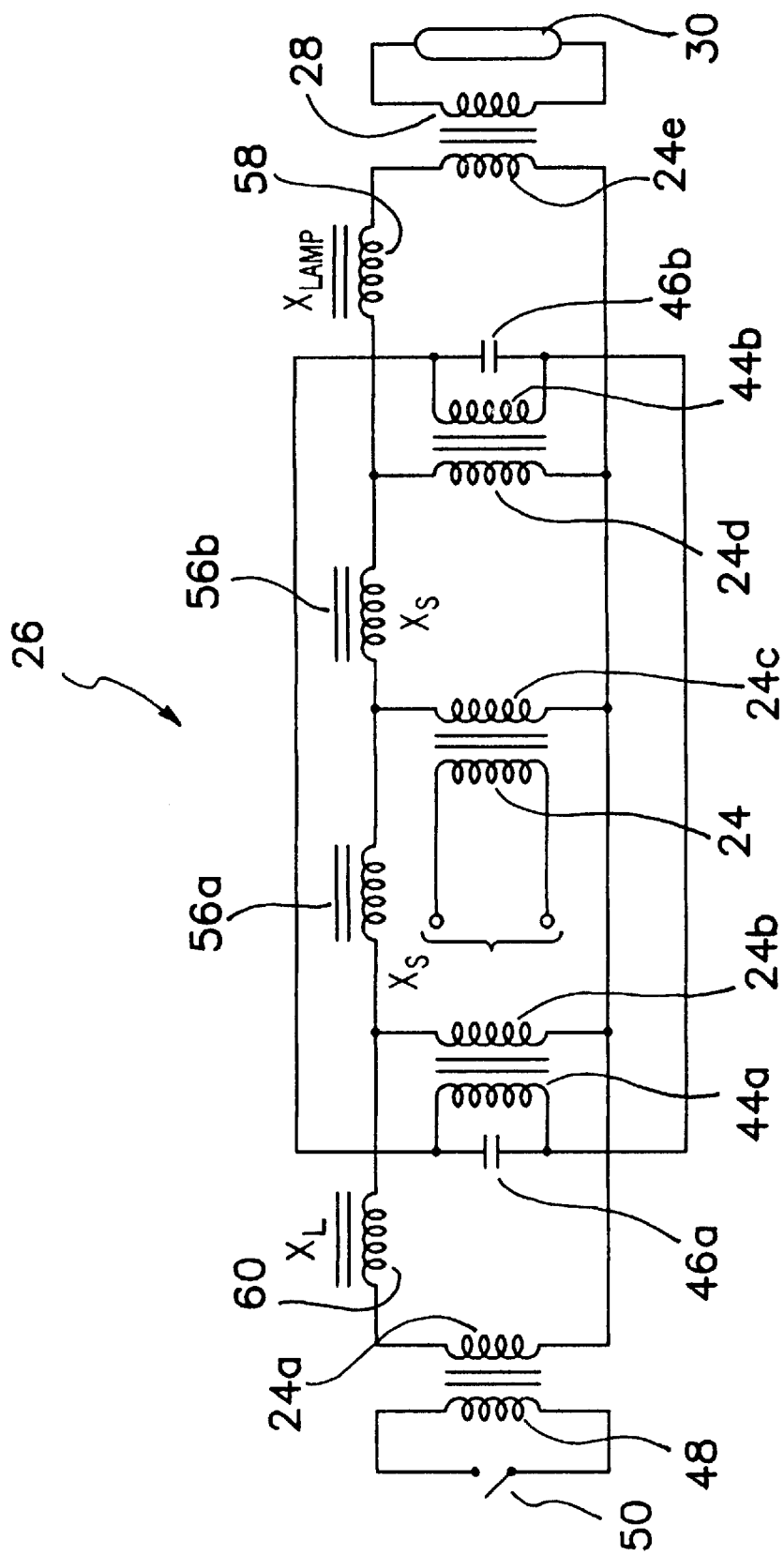
FIG. 2 is an equivalent circuit diagram of the ferroresonant transformer used in this invention.

FIG. 2 shows in more detail the equivalent circuit of the ferroresonant transformer 26.

The principle of the ferroresonant transformer 26 is that the leakage inductances 56a and 56b resonate with the capacitors 46a, 46b, respectively at 60 Hz. At resonance, the transformer 26 transfers power to the lighting loop 30 with maximum efficiency through windings 24e and 28 (in the equivalent circuit of FIG. 2, the windings 24a, 24b, 24c, 24d and 24e are all functional sections of a primary winding that drives the secondary windings 28, 44a, 44b and 48).

The inductances 56a, 56b, 58 and 60 cooperate to keep high frequency harmonics out of the AC input and field wiring to reduce the need for heavy wiring and to prevent interference with airport avionics. The resonant filtering action of the ferroresonant transformer 26 provides a very low harmonic distortion, so that the output waveform is almost purely sinusoidal. The resonant filtering also provides maximum noise immunity and complete isolation between the input and output circuitry.

When inductance is added to the circuit by lamp inductance 58 and control inductance 60, the transformer 26 becomes less resonant, and the gain of the transformer network, i.e., its ability to transfer power into the lighting loop 30, is reduced. By closing switch 50 in FIG. 2 during a selected portion of each cycle or half-cycle of the oscillation of the resonant circuit, the gain of the transformer 26 can thus be adjusted.

Figure 3:
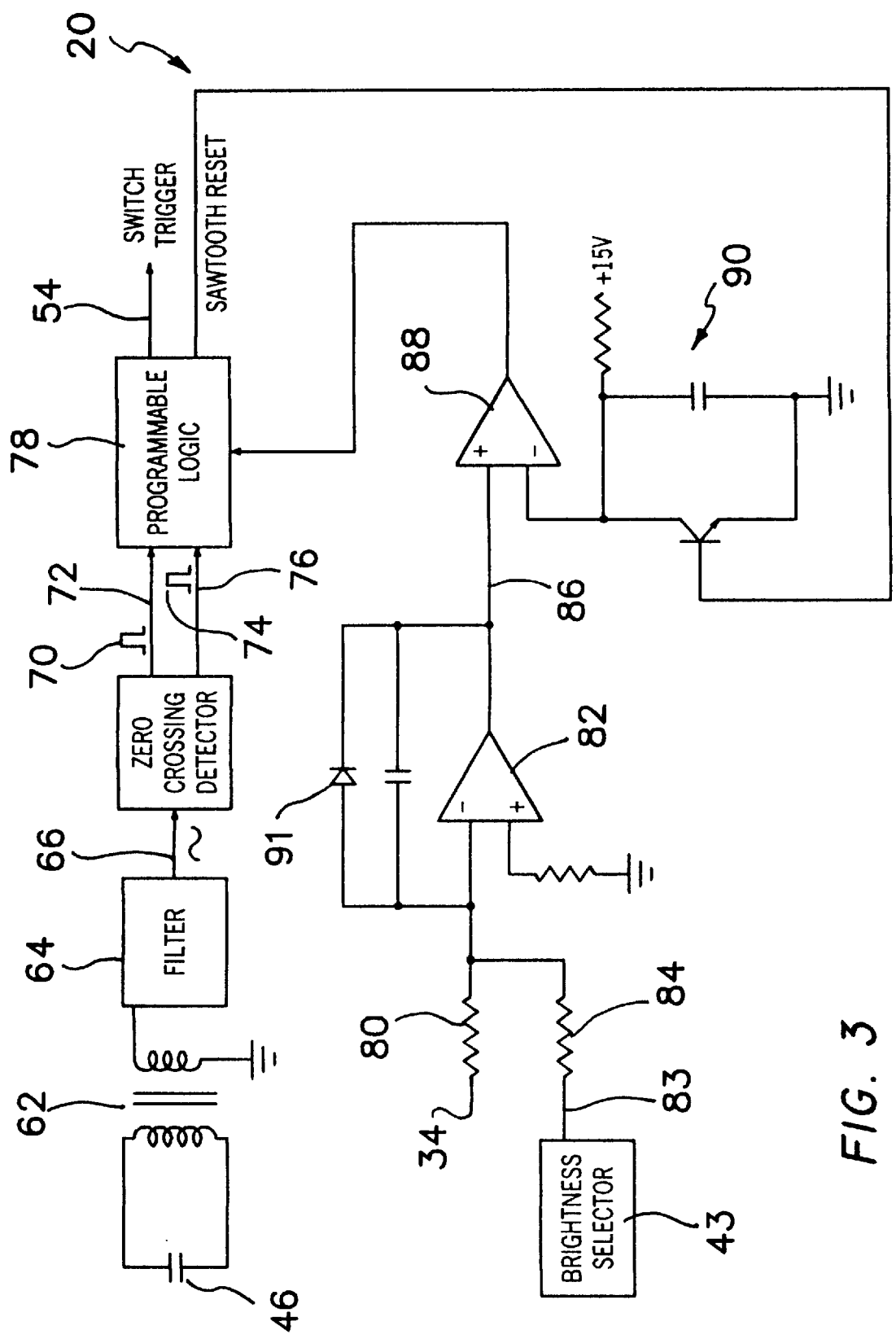
FIG. 3 is a block diagram of the transformer control circuit.
Figure 4:
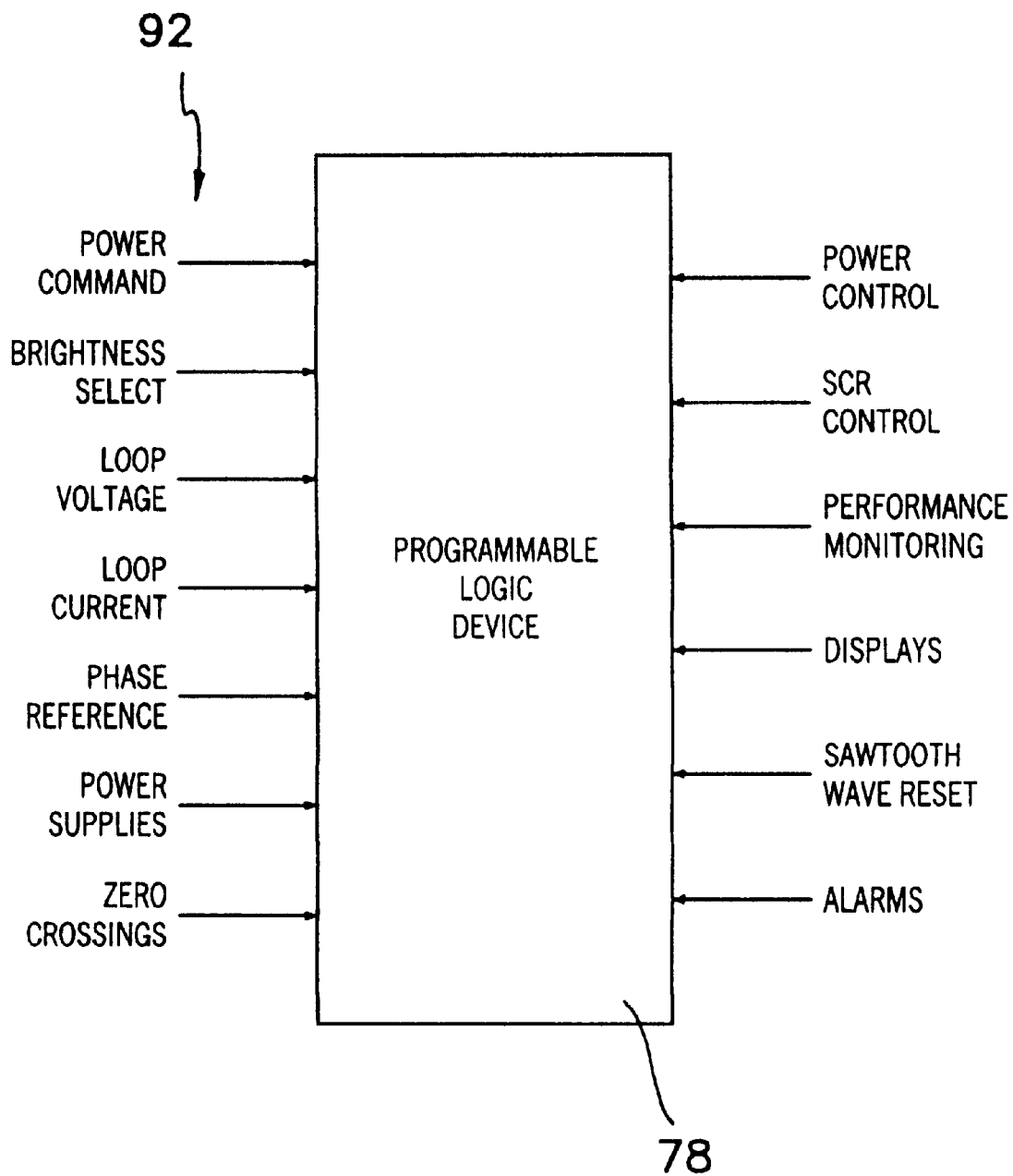
FIG. 4 is a block diagram showing relevant data inputs and outputs of the programmable logic used in the invention.

The manner in which this adjustment is made is shown in FIG. 3. In that figure, the inputs to the current control 20 are the voltage across capacitor 46, the actual loop current signal voltage 34, and the desired loop current signal voltage generated by the brightness selector 43.

The voltage across capacitor 46, which is a 60 Hz sine wave, is transmitted through isolation transformer 62 to a filter 64 which removes any spurious frequency components and puts out a clean 60 Hz sine wave 66. This sine wave is applied to a zero crossing detector 68 which puts out a positive-crossing pulse 70 on rail 72, and a negative-crossing pulse 74 on rail 76. The pulses 70 and 74 provide a timing reference to a programmable logic 78 which controls the SCR switch 50 in synchronism with the oscillations of the resonant circuit of transformer 26.

The actual loop current signal 34 is applied through summing resistor 80 to the subtractive input of an integrator 82, and the loop current reference signal 83 generated by the brightness selector 43 is applied to the same input through summing resistor 84. As long as the actual loop current is equal to the selected loop current reference, the current signals 34 and 83 (which are of opposite polarity) cancel each other out, and the continuously variable output of integrator 82 stays at a steady error voltage 87 which is applied to the negative input of comparator 88. The positive input of comparator 88 is a sawtooth generator 90 that resets at each zero crossing of the 60 Hz signal 66. When the level of the sawtooth wave equals the error signal 87, the comparator 88 puts out a logic "1" signal that causes the programmable logic device 78 to trigger the switch 50 closed until the next zero crossing of the signal 66. The zero crossing of signal 66 opens the switch 50 and resets the sawtooth generator 90.

When the brightness selector setting is changed; an extra inductive load due to lamp burnout changes the resonance of transformer 26; or some other imbalance between signals 34 and 83 occurs, the integrator 82 translates that imbalance into an increase or decrease in the error signal 86 so as to change the portion of the sawtooth wave during which the SCR switch 50 is closed. The purpose of diode 91 is to prevent overdriving the comparator 88 by limiting the negative change of voltage 86 to a single diode drop.

FIG. 5 diagrammatically illustrates the programmable logic device 78. Programming software within the device 78 is designed by conventional methods to scan the inputs 92 and, based thereon, carry out, i.e., the following functions: 1) following a power-up or shut-down command, the device 78, by forcing the switch closed, reduces brightness to a selectable low level for a short, selectable time before carrying out the command, so as to prevent large switching transients; 2) selectable out-of-range levels of circuit parameters such as AC input power voltage and lighting loop current are made to cause selectable responses such as alarms, power-downs or shut-downs; and 3) data for front-panel indicators and monitors is generated to show real-time status and operating parameters of the equipment. Because the inventive regulator maintains a constant output current even if the loop shorts out, the logic device reacts only to no-loop-current (i.e., open-loop) and overcurrent conditions. The latter may occur momentarily, for example, when the AC supply is toggled between commercial power and generator power.

The efficient, low heat-generating construction of the ferroresonant transformer 26 makes it possible to smoothly power any substantially resistive load from 30 to 50 kW or more without the use of switchable taps or oil cooling. That ability, coupled with the wide-ranging ability of the digital programmable logic device 78 to adjust the regulator's performance characteristics by software changes, results in a versatile and economic airport lighting control.

It should be understood that the exemplary constant current regulator for airport lighting described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A constant-current regulator for airport lighting loops, comprising:

a) a source of AC power;

b) a ferroresonant transformer having a primary coil connected to said source of AC power and a first secondary coil connected to a lighting loop for driving the same at a selected current level;

c) at least one second secondary coil connected to a capacitance to produce an AC voltage thereacross, said transformer having a leakage inductance which resonates with said capacitance at the frequency of said AC power source;

d) a third secondary coil selectably short-circuitable; and e) a control circuit arranged to short-circuit said third secondary coil during a selectable portion of each cycle of said AC voltage across said capacitance.

2. The regulator of claim 1, in which said control circuit includes a digital programmable logic device arranged to sense predetermined operational parameters of said regulator, and to take a programmable control action of said control circuit in response to variations in said parameters.

3. The regulator of claim 2, in which said logic device is programmed to temporarily reduce the current in said lighting loop below said selected current following a power-up or shut-down command.

4. The regulator of claim 2, in which said logic device is programmed to reduce the current in said lighting loop below said selected current in response to a selectable out-of-range condition of selected currents and voltages in the circuit of said regulator.

5. The regulator of claim 1, further comprising:

f) a sensor arranged to sense the current in said lighting loop, and to produce a first current signal representative thereof;

g) a brightness selector arranged to produce an opposite polarizing current signal representative of the current desired in said lighting loop;

h) an error integrator having a reference input and an error input, said error input being the difference between said first current and said opposite-polarity current, and the output of said integrator being a continuously variable error signal;

i) a comparator having as its inputs said error signal and a sawtooth wave, and having as its output a logic signal indicating whether said error signal is smaller or larger than the level of said sawtooth wave; and j) a programmable logic device arranged to short-circuit said third secondary coil in response to said logic signal until the next zero crossing of said AC voltage cycle.

6. The regulator of claim 1, in which said lighting loop includes lamps driven from said loop through isolation transformers.

7. The regulator of claim 1, in which said ferroresonant transformer is an air-cooled transformer with a power rating of at least 50 kW.

8. The regulator of claim 1, in which said ferroresonant transformer is an air-cooled transformer which maintains a substantially uniform power factor and efficiency throughout an output power range of substantially 30 to 50 kW without the need to switch winding taps.

* * * * *